March 19, 1968 K. I. HARNER 3,373,848
VISCOSITY INDEPENDENT HYDRAULIC FLOW REGULATOR
Filed Feb. 24, 1966 2 Sheets-Sheet 1

INVENTOR
KERMIT I. HARNER
BY Norman Friedland
ATTORNEY

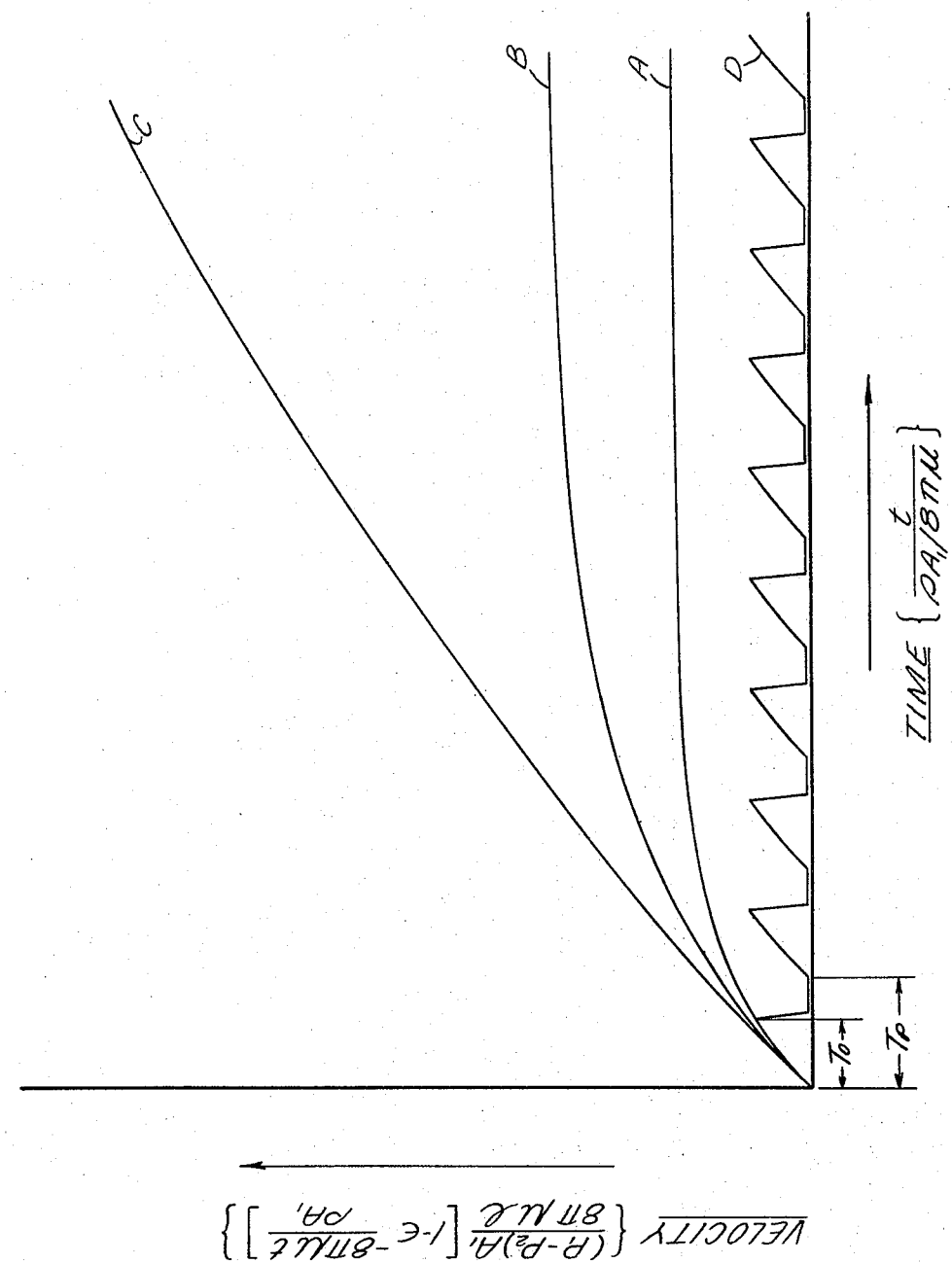

United States Patent Office 3,373,848
Patented Mar. 19, 1968

3,373,848
VISCOSITY INDEPENDENT HYDRAULIC
FLOW REGULATOR
Kermit I. Harner, Windsor, Conn., assignor to United Aircraft Corporation, East Hartford, Conn., a corporation of Delaware
Filed Feb. 24, 1966, Ser. No. 529,797
4 Claims. (Cl. 188—97)

ABSTRACT OF THE DISCLOSURE

Damping of a hydraulic servo system is effectuated by disposing a variable volume chamber at one end of a servo valve which is in communication with an inertia tube and chopper. The chopper is sequenced in time relation relative to the flow in the inertia tube such that the velocity of the flow in and out of the tube never reaches its terminal value.

---

This invention relates to flow regulators for hydraulic systems and in particular to a device for generating a flow which is proportional to the pressure drop across the device and which is essentially independent of changes in the viscosity of the operating fluid.

In practicing the art of hydraulic servo and control systems, it is often desirable to obtain a small flow rate which is proportional to applied pressure differential and which is relatively insensitive to viscosity changes of the operating fluid. Damping for hydraulic pilot valves is a typical example of a situation in which this type of flow is desirable. Heretofore, there has been no device which met these requirements. Damping of hydraulic pilot valves was generally provided by conventional pot-type damper in which the damping coefficient varies directly with fluid viscosity. In fuel controls for jet aircraft and in other devices subject to extreme temperature variations, the viscosity of the operating fluid is subject to wide variations and conventional viscous dampers are unsatisfactory because of the variation in speed of response and stability problems caused by variations in damping force. The use of orifice damping is also objectionable because of the non-linearity of the flow versus pressure drop characteristic of an orifice and because of the extremely small orifices required for some applications.

My invention utilizes the inertia of a fluid column to obtain a flow which is proportional to the pressure drop and insensitive to change in viscosity of the operating fluid. A hydraulic pulse generator or chopper element is combined in series with a relatively long conduit having a small cross-sectional area so that fluid passing through these elements is continuously accelerated or decelerated so that the flow in the conduit never reaches a terminal or steady state velocity. The average flow rate in the conduit will be proportional to the pressure drop across the combined elements. A conduit which meets these requirements when combined with a chopper element is sometimes referred to as an inertia tube.

In applying my invention to rotating spool valves, a chopper and inertia tube are placed in series in a flow path from an otherwise closed chamber at one end of the spool valve so that flow through the chopper and inertia tube creates a damping force on the valve.

It is an object of my invention to generate an average flow which is proportional to pressure drop and which is relatively independent of viscosity changes in the fluid being flowed.

It is a further object of my invention to provide a damper for spool valves which is relatively unaffected by changes in viscosity of the operating fluid.

It is a further object of this invention to provide a linear flow resistance which is independent of changes in fluid viscosity.

It is a further object of this invention to provide a fluid control device having an average flow which is proportional to pressure drop and which is relatively unaffected by changes in the viscosity of the operating fluid.

FIGURE 3 is a graphic representation of the flow in the inertia tube shown in FIGURE 1.

Figure 1:
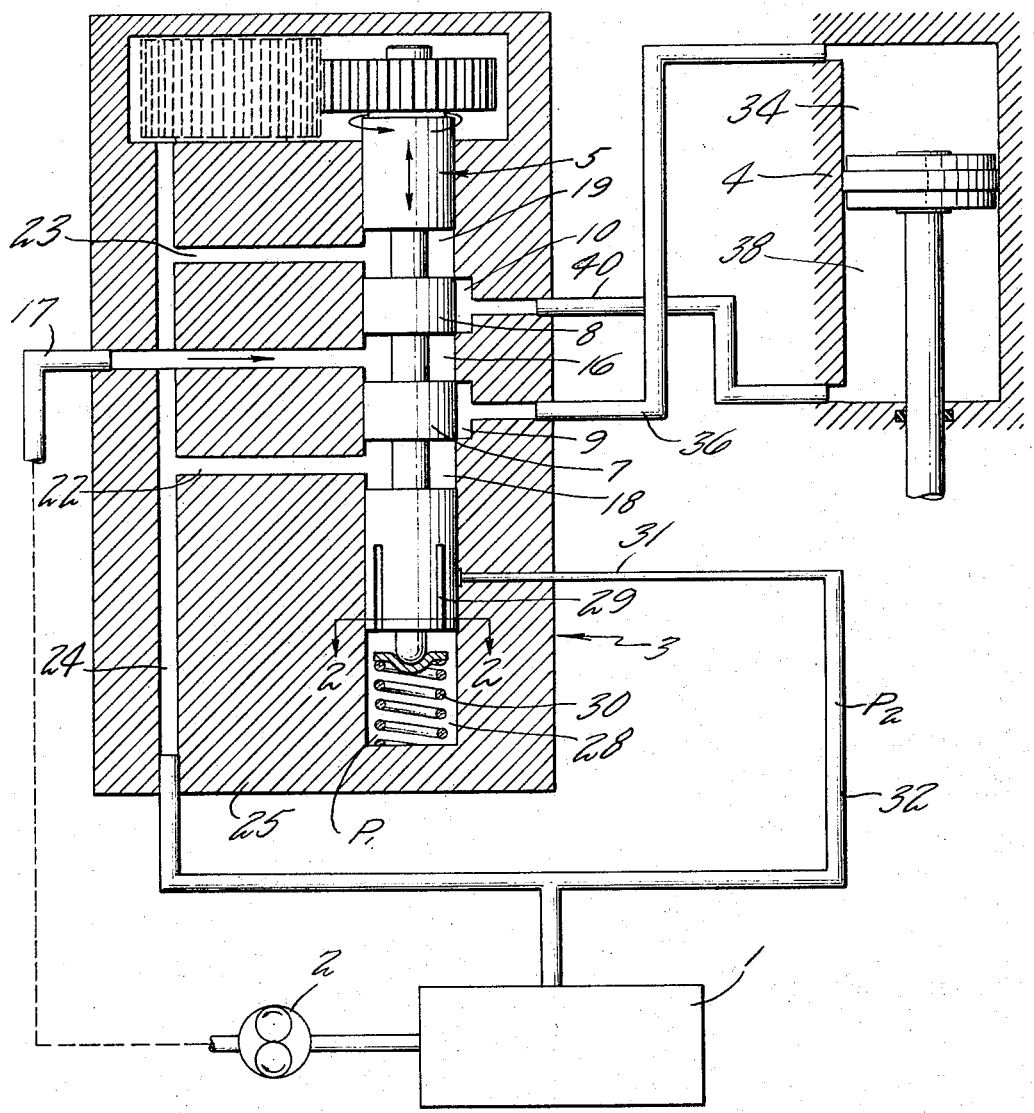
FIGURE 1 is a schematic representation of a simple hydraulic system in which my invention is utilized as a damper.

Referring now to FIGURE 1 there is shown a hydraulic servo system having a liquid reservoir 1, a high pressure pump 2, and a pilot valve generally indicated by numeral 3 for controlling the position of piston 4. The pilot valve is the rotating spool-type which is well known in the art. The spool 5 is continuously rotated through a gear system, not shown, and is axially positioned by an input force applied to the top of the valve. Spring 30 biases the spool in an upward direction.

Spool 5 contains metering lands 7 and 8 registering with ports 9 and 10 for metering fluid through lines 36 and 40 to chambers 34 and 38. High pressure fluid generated by pump 2 is supplied to annulus 16 through line 17. Annuli 18 and 19 drain into the reservoir through lines 22, 23 and 24. The spool 5 is closely fitted in the housing 25 to provide a high resistance path, and therefore effective sealing, between spool annuli.

The lower end of the pilot valve contains several equally spaced, identical slots 29 for periodically connecting the otherwise closed chamber 28 with an inertia tube 31 as the pilot valve rotates. A device such as this which will intermittently transmit a pressure signal is commonly referred to as a pressure pulse generator or a chopper. Line 32 connects the end of inertia tube 31 with the reservoir 1 which is at a constant pressure $P_2$.

CHARACTERISTICS OF AN INERTIA TUBE

An analysis of the flow characteristic of an inertia tube will assist in the understanding of my invention.

As indicated above an inertia tube is a hydraulic line which is periodically subject to pressure drop for short periods of time which are less than the time necessary for fluid in the tube to reach a terminal velocity.

Assuming that the inertia tube 31 in FIGURE 1 is filled with an incompressible fluid and that a constant pressure differential is applied across the ends of the tube. The application of Newton's second law to the fluid in the tube after it is initially subjected to a pressure drop yields:

(1) $$\Sigma F = ma = m\frac{dv}{dt}$$

(2) $$(P_1 - P_2)A_1 - Dv = m\frac{dv}{dt}$$

where $P_1 - P_2$ = the pressure differential across the tube
$A_1$ = cross-sectional area of the tube
$D$ = viscous flow resistance factor of the tube
$v$ = velocity of the fluid
$m$ = mass of the fluid in the tube Solving Equation 2 for $v$ yields:

(3) $$v = \frac{(P_1 - P_2)A_1}{D} - \frac{(P_1 - P_2)A_1 \epsilon^{\frac{-Dt}{m}}}{D}$$

For laminar flow-in tubes we may substitute $$D = 8\pi\mu l$$
$$m = \rho A_1 l$$

where:

$\mu$ = fluid viscosity, lb.-sec./in.$^2$
$l$ = length of inertia tube
$\rho$ = fluid density lb.-sec.$^2$/in.$^4$ into Equation 3 to yield:

(4) $$V = \frac{(P_1 - P_2)A_1}{8\pi\mu l}\left[1 - \epsilon^{\frac{-8\pi\mu t}{\rho A_1}}\right]$$

Curve A of FIGURE 3 represents this equation. The term $$\frac{(P_1 - P_2)A_1}{D}$$

is the steady-state term which determines what the final terminal or steady state velocity of the fluid in the tube would be if the pressure drop was maintained across the tube.

Figure 2:
FIGURE 2 is a cross section of the lower portion of the valve shown in FIGURE 1.

Curve B in FIGURE 2 represents the same system as depicted by curve A with only 50% of the viscous flow coefficient D. Curve C represents the system with only 10% of the tube viscous flow coefficient. These magnitudes of changes in operating conditions are not unusual in aircraft fluid control systems. It is apparent that the change in velocity due to changes in viscosity is initially insignificant, for all practical purposes, and increases to a maximum as the fluid reaches a terminal velocity.

When the pressure drop is initially applied across the tube the primary flow determining factor is the inertia of the fluid and not the viscous flow resistance of the tube. In this area of operation the line friction can be neglected and Equation 1 yields:

(5) $$(P_1 - P_2)A_1 = m\frac{dv}{dt}$$

Substituting $m = \rho A_1 l$ into Equation 5 yields $$(P_1 - P_2)A_1 = \rho A_1 l\frac{dv}{dt}$$

where $\rho$ = density of the fluid
$l$ = length of the line

Solving for $v$ (6) $$v = \frac{P_1 - P_2}{\rho l}\int dt$$

Substituting of Equation 6 into the general flow equation $$q = A_1 v$$

where $q$ = flow rate yields (7) $$q = \frac{A_1(P_1 - P_2)}{\rho l}\int dt$$

From Equation 7 it will be seen that as long as the primary flow determining factor in the line is the fluid inertia and not the fluid viscosity, the average flow rate in the line will be proportional to the pressure drop and will be relatively insensitive to changes in the viscosity of the operating fluid. This is also apparent when the initial characteristics of curves A, B and C are compared.

OPERATION OF THE VALVE

When the pilot valve is in the neutral or null position, as shown in FIGURE 1, flow from annulus 16 to ports 9 and 10 is equal and the piston 4 is stationary. As the valve is moved downward high pressure in annulus 16 is communicated to chamber 34 through line 36 and acts on the upper surface of piston 4 to cause it to move downward. Annulus 19 is opened to port 10 for receiving fluid being forced from chamber 38 through line 40. As long as the valve is below the null position the piston will continue to move downward. A feedback system, not shown, is connected to the piston to cause a nulling force on the pilot valve when the piston has moved the required distance. Similarly, when the pilot valve is displaced upward the piston 4 will move upward until a feedback signal returns the pilot valve to its null position.

OPERATION OF THE DAMPER

The chopper at the lower end of the spool valve intermittently connects chamber 28 with the inertia tube as the pilot valve rotates. When the pilot valve is moving either up or down a pressure differential will exist between chamber 28 and line 32 which will be intermittently applied to the inertia tube. The fluid in the inertia tube will be accelerated along Curve A of FIGURE 2 each time a slot in the spool valve opens chamber 28 to the inertia line. If the open time of the chopper during each chopping cycle is kept small compared to $$\frac{m}{D}\left[\frac{\rho A_1}{8\pi\mu}\right]$$

then the average flow rate for the time during which the chopper is open is $$\frac{1}{To}\int_0^{To} q\,dt = \frac{A_1(P_1 - P_2)To}{2\rho l}$$

When the chopper is closed the flow rapidly falls to zero. Therefore the average flow for the entire chopping cycle is approximately (8) $$Q\text{ avg.} = \frac{A_1(P_1 - P_2)(To)^2}{2\rho l Tp}$$

where $To$ = time the chopper is open
$Tp$ = time for one chopping cycle

The fluid is accelerated for a time period, or open time, $To$, which is determined by the width of the slot and the peripheral velocity of the spool valve. As the spool slot closes off the inertia tube the velocity of the fluid in the tube will rapidly drop to a small value which is determined by the leakage in the valve. As the valve continues to rotate the flow remains small until the next slot opens chamber 28 to the inertia tube and repeats the cycle. Curve D of FIGURE 2 is the plot of this cyclic operation.

The pressure drop across the inertia line is related to the unbalanced force applied to the valve in the axial direction by the equation:

(9) $$F = A_2(P_1 - P_2)$$

where $A_2$ = cross-sectional area of the valve
$F$ = unbalanced force applied to the valve
$V_v$ = velocity of the valve The velocity of the valve is determined by the flow equation:

(10) $$Q\text{ avg.} = A_2 v_{v\text{avg}}.$$

Solving for $v_{v\text{avg}}$ and substituting Equation 8 yields:

(11) $$v_v = \frac{A_1(P_1 - P_2)(To)^2}{A_2^2 \rho l Tp}$$

Damping is usually measured in terms of the damping coefficient $d$ defined by the following equation:

Damping equals

(12) $$d = \frac{F}{v_v}$$

Substituting Equations 9 and 11 yields $$d = \frac{A_2{}^2 2\rho l T p}{A_1 (To)^2}$$

Although I have described only a single embodiment of my invention I do not intend to limit its application to damping systems alone. This invention can be used whenever it is desirable to obtain a flow which is proportional to the pressure drop across the system and which is relatively insensitive to changes in viscosity in the operating fluid. The cross-sectional shape and geometry of the tube can be varied to satisfy physical limitations without changing the basic operation of the system.

I claim as my invention:

1. A hydraulic system which is relatively insensitive to viscosity changes of the fluid in the system including a flow passage and means associated with said passage for periodically creating a fluid pressure drop across said passage for time periods which are less than the time required for the fluid in the passage to reach a terminal velocity so as to satisfy the formula $$\text{Average flow through said passage} = \frac{A(\Delta P)(To)^2}{2\rho l T p}$$

where $A$ = cross sectional area of said passage
$\Delta P$ = pressure differential across said passage
$\rho$ = fluid density lb.-sec.$^2$/in.$^4$
$l$ = length of said passage
$To$ = time said means communicates with said passage
$Tp$ = one cycle produced by said means 2. A hydraulic system comprising:
a fluid reservoir at a relatively constant pressure;
a fluid chamber;
means for varying the pressure in said chamber;
a fluid conduit interconnecting said reservoir and said chamber, and
a valve in the flow path formed by said conduit between said reservoir and said chamber for controlling the flow therethrough, said valve periodically opening the flow path for time periods which are less than the time required for the fluid in the conduit to reach a steady state velocity whereby the average flow in said conduit will be proportional to the pressure differential between said chamber and said reservoir and will be relatively insensitive to changes in the viscosity of the fluid in the system and being in accordance with the expression $$Q \text{ average} = \frac{A(\Delta P)(To)^2}{2\rho l T p}$$

where $A$ = cross sectional area of said conduit
$\Delta P$ = pressure differential across said conduit
$\rho$ = fluid density lb.-sec.$^2$/in.$^4$
$l$ = length of said conduit
$To$ = time said valve communicates with said conduit
$Tp$ = one cycle produced by said valve 3. The system as defined in claim 2 wherein the means for varying the pressure in said chamber includes a piston which forms a wall of said chamber and means for applying a variable force tending to move said piston and thereby change the size of said chamber.

4. A system for damping the motion of an object along a single axis comprising:
a piston attached to the object for movement therewith;
a cylinder surrounding said piston, said cylinder having one end closed to form a pressure chamber with said piston;
a fluid reservoir at a relatively constant pressure;
a fluid conduit interconnecting said reservoir and the chamber formed in said cylinder; and
a valve in the flow path between the chamber in said cylinder and said reservoir for controlling the flow therethrough, said valve periodically opening the flow path for time periods which are less than the time required for the fluid in the conduit to reach a steady state velocity; whereby an average force which is proportional to the velocity of the piston and which is relatively insensitive to changes in viscosity of the fluid in the system will resist the motion of the object and the piston and the flow being in accordance with the expression $$Q \text{ average} = \frac{A(\Delta P)(To)^2}{2\rho l T p}$$

where $A$ = cross sectional area of said conduit
$\Delta P$ = pressure differential across said conduit
$\rho$ = fluid density lb.-sec.$^2$/in.$^4$
$l$ = length of said conduit
$To$ = time said valve communicates with said conduit
$Tp$ = one cycle produced by said valve.

References Cited

UNITED STATES PATENTS

| 1,026,626 | 5/1912 | Greene | 188—97 |
| 1,522,243 | 1/1925 | Hughes | 188—97 |
| 3,035,562 | 5/1962 | Bessiere | 137—625.11 X |

MILTON BUCHLER, *Primary Examiner.*

G. E. HALVOSA, *Examiner.*